(12) United States Patent
Xiao et al.

(10) Patent No.: US 8,756,654 B2
(45) Date of Patent: Jun. 17, 2014

(54) TRUSTED NETWORK MANAGEMENT METHOD OF TRUSTED NETWORK CONNECTIONS BASED ON TRI-ELEMENT PEER AUTHENTICATION

(75) Inventors: Yuelei Xiao, Shaanxi (CN); Jun Cao, Shaanxi (CN); Xiaolong Lai, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 296 days.

(21) Appl. No.: 13/059,798

(22) PCT Filed: Aug. 20, 2009

(86) PCT No.: PCT/CN2009/073369
§ 371 (c)(1),
(2), (4) Date: Feb. 18, 2011

(87) PCT Pub. No.: WO2010/020187
PCT Pub. Date: Feb. 25, 2010

(65) Prior Publication Data
US 2011/0162042 A1    Jun. 30, 2011

(30) Foreign Application Priority Data

Aug. 21, 2008  (CN) .......................... 2008 1 0150695

(51) Int. Cl.
| | |
|---|---|
| *G06F 17/00* | (2006.01) |
| *G06F 7/04* | (2006.01) |
| *G06F 17/30* | (2006.01) |
| *G06F 15/16* | (2006.01) |
| *H04L 29/06* | (2006.01) |

(52) U.S. Cl.
USPC ............ 726/2; 726/1; 726/3; 726/4; 713/150; 713/151; 713/156

(58) Field of Classification Search
USPC .............................................. 713/156; 726/3
See application file for complete search history.

(56) References Cited

U.S. PATENT DOCUMENTS 8,271,780 B2 *  9/2012  Xiao et al. ..................... 713/156
8,336,081 B2 * 12/2012  Xiao et al. ......................... 726/1
(Continued)

FOREIGN PATENT DOCUMENTS

CN        1976337 A    6/2007
CN      101136928 A    3/2008
(Continued)

OTHER PUBLICATIONS

TCG Credential Profiles Specification Version 1.0 Jan. 18, 2006.*
(Continued)

*Primary Examiner* — Kambiz Zand
*Assistant Examiner* — Benjamin Kaplan
(74) *Attorney, Agent, or Firm* — Harness, Dickey & Pierce, P.L.C.

(57) ABSTRACT

A trusted network management method of trusted network connections based on tri-element peer authentication. A trusted management proxy and a trusted management system are respectively installed and configured on a host to be managed and a management host, and are verified as local trusted. When the host to be managed and the management host are not connected to the trusted network, they use the trusted network connection method based on the tri-element peer authentication to connect to the trusted network respectively, and subsequently perform the authentications and the cipher key negotiations of the trusted management proxy and the trusted management system; when the host to be managed and the management host have not completed the user authentication and the cipher key negotiation process, they use the tri-element peer authentication protocol to complete the user authentication and the cipher key negotiation process, then use the tri-element peer authentication protocol to implement the remote trust of the trusted management proxy and the trusted management system, and finally perform network management. The present invention can actively defend attacks, reinforce the safety of the trusted network management architecture, and realize the trusted network management of distributed control and centralized management.

6 Claims, 1 Drawing Sheet

(56) References Cited

U.S. PATENT DOCUMENTS

| | | | |
|---|---|---|---|
| 2006/0221828 A1 | 10/2006 | Towle | |
| 2007/0107043 A1 | 5/2007 | Newstadt et al. | |
| 2007/0143629 A1 | 6/2007 | Hardjono et al. | |
| 2008/0168271 A1 | 7/2008 | Sherburne et al. | |
| 2010/0083349 A1 | 4/2010 | Xiao et al. | |
| 2011/0191579 A1* | 8/2011 | Xiao et al. | 713/156 |
| 2012/0005718 A1* | 1/2012 | Xiao et al. | 726/1 |

FOREIGN PATENT DOCUMENTS

| | | |
|---|---|---|
| CN | 101159660 A | 4/2008 |
| CN | 101242266 A | 8/2008 |
| CN | 101242267 A | 8/2008 |
| CN | 101242297 | 8/2008 |
| CN | 101345660 | 1/2009 |
| CN | 101345766 A | 1/2009 |
| CN | 101394283 A | 3/2009 |
| CN | 101431517 A | 5/2009 |
| CN | 101442531 A | 5/2009 |

OTHER PUBLICATIONS

Simple Network Management Protocol (SNMP) 1988, Internet Engineering Task Force, downloaded from the internet: http://www.rfc-archive.org/getrfc.php?rfc=1067.

The Common Object Request Broker: Architecture and Specification, CORBA V2.3, Jun. 1999.

ITU-T Recommendation X.710 (Oct. 1997) Series X: Data Networks and Open System Communication.

ITU-T Recommendation X.711 (Oct. 1997) Series X: Data Networks and Open System Communication.

Extended European Search Report regarding Application No. 09807886.8-2413 / 2320600, dated Feb. 16, 2012.

TCG Trusted Network Connect Tnc Architecture for Interoperability, Specification Version 1.3, Revision 6, Apr. 28, 2008.

Extended European Search Report regarding Application No. 09807887.6-2413/2317693 PCT/CN2009073370, dated Feb. 6, 2012.

* cited by examiner

TRUSTED NETWORK MANAGEMENT METHOD OF TRUSTED NETWORK CONNECTIONS BASED ON TRI-ELEMENT PEER AUTHENTICATION

This application claims priority to Chinese Patent Application No. 200810150695.6, filed with the Chinese Patent Office on Aug. 21, 2008 and entitled "a trusted network management method of trusted network connections based on tri-element peer authentication", which is hereby incorporated by reference in its entirety.

FIELD OF THE INVENTION

The present invention relates to the field of network management and particularly to a trusted network management method of a trusted network connection based on tri-element peer authentication.

BACKGROUND OF THE INVENTION

The concept of network management has been increasingly known to people along with development of the Internet. Earlier, the Internet involved a small number of nodes with an access thereto and was simply deployed, typically in a flat structure, and it was therefore rather simple and easy to perform management including failure detection, performance supervision, etc., on the Internet. However, along with constant development of the network, constant emergence of new network technologies and constant retrofitting of network products, it becomes increasingly difficult to plan and expand the network, and practical problems of how to make the best of respective components of the network, how to maintain good reliability and superior efficiency of the network, etc., have hastened the emergence of network management. The development of today's communication networks features an increasing scale, an increasing functional complexity and a gradual integration of heterogeneous networks, etc., and this trend poses an unprecedented challenge to network management. Network management involves planning, designing and controlling of resources and devices constituting a network to enable the network with the highest efficiency and productivity, thereby serving a user efficiently.

A centralized management model is commonly adopted in a traditional network management system, e.g., an administrator/agent model in the Simple Network Management Protocol (SNMP) proposed by the Internet Engineering Task Force (IETF) in 1988. Along with the increasing scale of networks, drawbacks of the SNMP-based network management model have gradually revealed: management nodes have increasingly become a bottleneck of network management due to the increasing number of users; an excessive number of polls and widely distributed agents necessitate an excessive bandwidth overhead and degrade the efficiency; and the bandwidth is wasted and a large number of precious resources of the CPU of an administrator are consumed for transmission of raw data which is retrieved from the respective agents and used as management information, thus decreasing the efficiency of network management. Furthermore, the centralized management mode stated above is also adopted in a network management system in the Common Management Information Protocol (CMIP), which is somewhat more complex than the SNMP. Generally, the SNMP is mainly applicable to management on a data network, and the CMIP is mainly applicable to management on a telecommunication network.

In view of the foregoing problems, network management systems are increasingly developing rapidly towards distribution and intelligence. There are two trends in the distributed network management development, in one of which a large distributed network management system, which is open, standardized and extensible, can be easily designed by a distributed calculation facility based on the existing network management framework, and the large distributed network management system primarily includes a Common Object Request Broker Architecture (COBRA)-based distributed network management system and a Web-based distributed network management system; and in the other of which a new distributed network management is involved, e.g., a network management system based on a mobile agent. In the distributed network management, network management and supervision is distributed throughout the whole network instead of relying on a single control center, thus offering the advantages of a reduced traffic of network management, a more powerful management capability, more extensibility, etc. However, both the centralized and distributed network management systems suffer the following security problems:

A host where an agent resides may attack the agent, and the security of the agent can not be ensured in an existing detection-based method;

Also, an agent may attack a host where the agent resides, for example, the agent attempts an illegal access to some private information of the host where it resides, and at present such an attack has to be passively prevented only through intrusive detection;

An administrator system is totally trusted by a network management user, which may be out of security because the administrator system may be controlled by a virus, a Trojan horse, etc., and will not work as intended for the network management user, thus resulting in a loss of management and control on the network; and An administrator system is totally trusted by a managed host, which may also be out of security. The managed host has to detect if the administrator system has been invaded by a virus, a Trojan horse, etc., otherwise the managed host may be subject to a hostile behavior from an agent residing in the managed host because of receiving a hostile management command by the agent.

In order to ensure trustworthiness of various terminals (including a PC, a mobile phone, other mobile intelligent terminals) and trustworthiness between terminals in a network environment, the international Trusted Computing Group (TCG) has defined a trusted computing framework and established a series of trusted computing specifications. The trusted computing framework ensures the security throughout a whole system generally by enhancing the security of the existing terminal architecture. A general idea thereof lies in that a trusted architecture is introduced to various terminal hardware platforms to improve the security of terminal systems depending on security features provided by the trusted architecture. A core of trustworthiness of the terminal is a trusted chip referred to as a Trusted Platform Module (TPM). Trustworthiness of a terminal can be enabled with the TPM, and trustworthiness between terminals in a network environment can be enabled over a trusted network connection based on the TPM. FIG. 1 illustrates a trusted network connection architecture based on tri-element peer authentication.

In this trusted network connection architecture, a Policy Manager (PM) acts as a third party of an Access Requestor (AR) and an Access Controller (AC), and the AR and the AC perform their mutual user authentication and mutual platform integrity evaluation through the PM to thereby implement a trusted network connection. After the AR in FIG. 1 is connected to a trusted network, the AR has to be managed by a network management system while obviating the security drawbacks of the foregoing centralized and distributed network management systems to thereby deploy an indeed trusted network.

SUMMARY OF THE INVENTION

The present invention provides a trusted network management method over a trusted network connection based on tri-element peer authentication to solve the foregoing technical problems in the prior art.

A technical solution of the present invention provides a trusted network management method over a trusted network connection based on tri-element peer authentication, which includes:

1) installing and configuring a trusted management agent residing in a managed host and a trusted management system residing in a managing host;

2) verifying the trusted management agent for trustworthiness on the managed host and the trusted management system for local trustworthiness;

3) if the managed host and the managing host have not been connected to a trusted network, connecting the managed host and the managing host to the trusted network respectively via a trusted network connection based on tri-element peer authentication, wherein the managed host and the managing host act as an access requestor, AR, in a trusted network connection architecture based on tri-element peer authentication, and then performing the step 4); if the managed host and the managing host have been connected to a trusted network, performing the step 4) directly;

4) performing, by the trusted management agent and the trusted management system, authentication and key negotiation;

5) if user authentication and key negotiation has not been completed between the managed host and the managing host, firstly performing, by the managing host and the managed host, mutual user authentication in a tri-element peer authentication protocol in which the managed host acts as an AR and the managing host acts as an access controller, AC, and then negotiating by the managed host and the managing host a session key using a primary key generated from the mutual user authentication and subsequently performing the step 6); if user authentication and key negotiation has been completed between the managed host and the managing host, performing the step 6) directly;

6) verifying, by the managed host and the managing host, remote trustworthiness of the trusted management agent and the trusted management system in the tri-element peer authentication protocol in which the managed host acts as an AR and the managing host acts as an AC; and 7) performing network management.

In the step 1), the trusted management agent is installed and configured by a network administrator or a network user; and if the trusted management agent is installed and configured by the network user, a profile is distributed from the network administrator to the network user and unknowable to the network user.

The verifying the trustworthiness of the trusted management agent on the managed host in the step 2) comprises:

measuring, storing and reporting, by the network user of the managed host, an integrity of the trusted management agent through a trusted platform module, TPM, to thereby verify the trusted management agent for trustworthiness on the managed host; and verifying the local trustworthiness of the trusted management system in the step 2) comprises:

measuring, storing and reporting, by the network administrator of the managing host, an integrity of the trusted management system through a TPM to thereby verify the trustworthiness of the local trusted management system.

The performing, by the trusted management agent and the trusted management system, authentication and key negotiation in the step 4) comprises: probing, by the trusted management agent on the managed host, automatically the corresponding trusted management system; starting, by the trusted management system, authentication between the trusted management system and the trusted management agent on receiving the probe information from the trusted management agent; and then performing, by the trusted management system and the trusted management agent, mutual authentication and key negotiation using their respective profiles.

The verifying, by the managed host and the managing host, the remote trustworthiness of the trusted management agent and the trusted management system in the tri-element peer authentication protocol in which the managed host acts as an AR and the managing host acts as an AC in the step 6) comprises the following sub-steps of:

6.1) requesting, by the managing host, the managed host for a platform configuration register value corresponding to the trusted management agent on the managed host, and requesting, by the managed host, the managing host for a platform configuration register value corresponding to the trusted management system on the managing host;

6.2) retrieving, by the managed host, the platform configuration register value corresponding to the trusted management agent from the local TPM and performing platform attestation identity key, AIK, signing thereon in the TPM, and retrieving, by the managing host, the platform configuration register value corresponding to the trusted management system from the local TPM and performing platform AIK signing thereon in the TPM;

6.3) transmitting, by the managing host, the signed platform configuration register values corresponding to the trusted management agent and the trusted management system, measurement logs of the platform configuration register values corresponding to the trusted management agent and the trusted management system, an AIK certificate of the managing host and an AIK certificate of the managed host to a policy manager, and verifying, by the policy manager, the AIK certificates of the managing host and the managed host for validity and checking the platform configuration register values corresponding to the trusted management agent and the trusted management system;

6.4) signing, by the policy manager, a result of verifying the AIK certificates of the managing host and the managed host for validity and a result of checking the platform configuration register values corresponding to the trusted management agent and the trusted management system for integrity by using a private key corresponding to the identity certificate of the policy manager, and transmitting the signature, the result of verifying the AIK certificates of the managing host and the managed host for validity and the result of checking the platform configuration register values corresponding to the trusted management agent and the trusted management system for integrity to the managing host, which in turn forwards the same to the managed host; and 6.5) judging, by the managing host and the managed host, the remote trustworthiness of the trusted management agent and the trusted management system according to the result of verifying the AIK certificates of the managing host and the managed host for validity and the result of checking the platform configuration register values corresponding to the trusted management agent and the trusted management system for integrity.

The performing the network management in the step 7) comprises:

permitting, by the network user of the managed host, communication with the managing host for management if confirming that both the trusted management system of the managing host and the trusted management agent operating on the managed host are trusted;

and transmitting, by the network administrator of the managing host, a secure management policy to the trusted management agent on the managed host over a secure channel between the trusted management system and the trusted management agent and performing, by the trusted management agent, a management function on the managed host under the secure management policy distributed from the network administrator if confirming that both the trusted management system operating on the managing host and the trusted management agent of the managed host are trusted.

In the trusted network management architecture according to the present invention, a trusted management agent resides in a managed host and a trusted management system resides in a managing host. Both the managed host and the managing host are provided with respective TPMs to thereby constitute respective trusted computing platforms through the TPMs. Both the trusted management agent and the trusted management system are software in the trusted computing platforms. Both the trusted management agent and the trusted management system are software certificated by a third party and their standard integrity measurement values have been published. The TPMs of the managed host and the managing host can measure, store and report the integrity of the trusted management agent and the trusted management system. With these functions of the TPM, the managed host and the managing host can ensure the trustworthiness of both the trusted management agent and the trusted management system, and then perform a function of mutual network management to thereby enable trusted network management. Therefore, the present invention offers the following advantages:

1. The managed host and the managing host enable local trustworthiness of the trusted management agent and the trusted management system based on their local TPMs to thereby prevent actively the trusted management agent from attempting an attack behavior to the managed host and ensure that the trusted management system on the managing host performs an intended function.

2. The managed host and the managing host are connected to a trusted network in a tri-element peer authentication protocol to ensure trustworthiness of the managed host and the managing host, thereby enhancing the security of a trusted network management architecture.

3. Mutual user authentication between the managed host and the managing host is performed in the tri-element peer authentication protocol, and a policy manager as a trusted third party is responsible for verifying user identity certificates of the managed host and the managing host for validity, thereby further enhancing the security of the trusted network management architecture.

4. The managed host and the managing host enable remote trustworthiness of the trusted management agent and the trusted management system in the tri-element peer authentication protocol. The policy manager is responsible for verifying an AIK certificate for validity and checking the trusted management agent and the trusted management system for integrity, thereby further enhancing the security of the trusted network management architecture.

5. Trusted management agents residing in respective managed hosts can control respective managed hosts, and the trusted management system residing on a managing host can manage and control all of managing hosts, thereby implementing trusted network management with distributed control and centralized management.

DETAILED DESCRIPTION OF THE INVENTION

Figure 1:
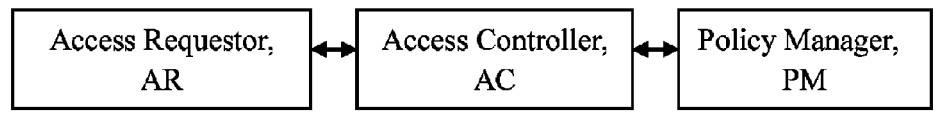
FIG. 1 is a diagram illustrating a trusted network connection architecture based on tri-element peer authentication.
Figure 2:
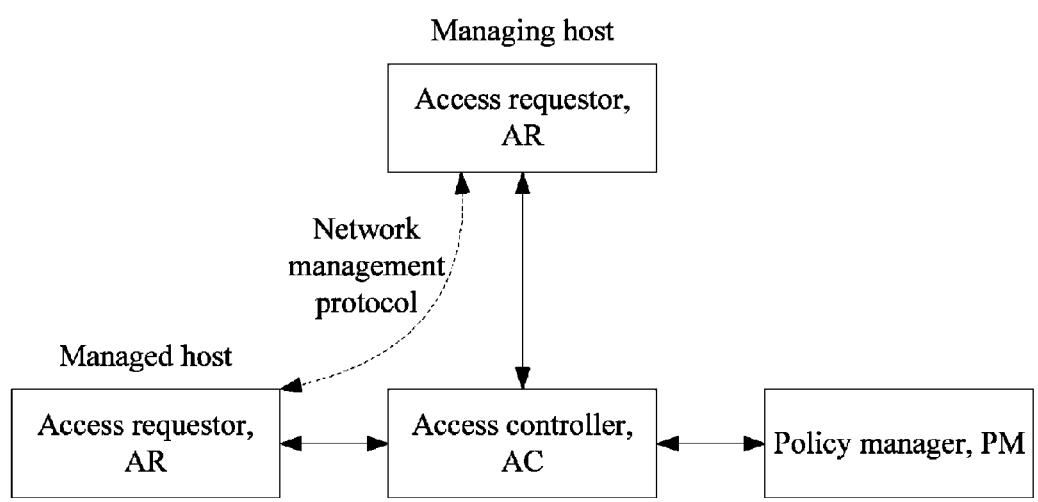
FIG. 2 is a diagram illustrating a trusted network connection management architecture over a trusted network connection based on tri-element peer authentication according to an embodiment of the present invention.

Referring to FIG. 2, the trusted network management over a trusted network connection based on tri-element peer authentication according to an embodiment of the present invention is performed particularly in the following steps:

1. Both a trusted management agent and a trusted management system are installed and configured.

The trusted management agent may be installed and configured by a network administrator or a network user. If the trusted management agent is installed and configured by the network user, a profile must be distributed from the network administrator to the network user and the contents of the profile must be unknowable to the network user.

The trusted management system may be installed and configured by the network administrator.

The trusted management agent and the trusted management system may alternatively be installed and configured in the form of being preinstalled by a manufacturer.

Both the trusted management agent and the trusted management system are software modules signed after being certificated by a trusted third party of the trusted management agent and the trusted management system over trusted computing platforms, and their standard integrity measurement values are stored in a network database accessible for a query after they are signed by the trusted third party.

2. Local trustworthiness of the trusted management agent and the trusted management system is enabled.

The network user of a managed host can measure, store and report an integrity of the trusted management agent through a trusted platform module, TPM, to thereby verify the trustworthiness of the trusted management agent on the managed host. Alike, the network administrator of a managing host can measure, store and report an integrity of the trusted management system through a trusted platform module, TPM, to thereby verify the trustworthiness of the local trusted management system.

3. The managed host and the managing host are connected to a trusted network.

If the managed host and the managing host have not been connected to the trusted network, the managed host and the managing host are connected to the trusted network and subsequently the step 4) is performed; otherwise, the step 4) is performed directly;

The connection of the managed host and the managing host to the trusted network is as follows: the managed host and the managing host are connect to the trusted network respectively via a trusted network connection based on tri-element peer authentication, and the managed host and the managing host act as the access requestor, AR, in a trusted network connection architecture based on tri-element peer authentication.

4. Authentication and key negotiation of the trusted management agent and the trusted management system is performed.

The trusted management agent is software program which can operate automatically when the system of the managed host is started. The trusted management agent on the managed host probes automatically the corresponding trusted management system. The trusted management system starts authentication between itself and the trusted management agent on receiving probe information from the trusted management agent, and then the trusted management system and the trusted management agent perform mutual authentication using respective profiles and negotiate a session key to secure communication between the trusted management agent and the trusted management system.

5. User authentication and key negotiation between the managed host and the managing host is performed.

If user authentication and key negotiation has not been completed between the managed host and the managing host, the user authentication and key negotiation is performed between the managed host and the managing host and the step 6) is performed; if user authentication and key negotiation has been completed between the managed host and the managing host, the step 6) is performed directly;

User authentication and key negotiation between the managed host and the managing host is as follows: the managed host and the managing host firstly perform mutual user authentication in a tri-element peer authentication protocol in which the managed host acts as an AR and the managing host acts as an access controller, AC, and then perform session key negotiation using a primary key generated from the mutual user authentication to negotiate a session key to secure data transmission of remote integrity evaluation on the trusted management agent and the trusted management system.

6. Remote trustworthiness of the trusted management agent and the trusted management system is enabled.

The managed host and the managing host enable remote trustworthiness of the trusted management agent and the trusted management system in the tri-element peer authentication protocol in which the managed host acts as an AR and the managing host acts as an AC. The remote trustworthiness of the trusted management agent and the trusted management system is enabled particularly as follows:

Firstly, the managing host requests the managed host for a platform configuration register value corresponding to the trusted management agent on the managed host, and the managed host requests the managing host for a platform configuration register value corresponding to the trusted management system on the managing host; next, the managed host retrieves the platform configuration register value corresponding to the trusted management agent from the local TPM and performs platform attestation identity key AIK signing thereon in the TPM, and the managing host retrieves the platform configuration register value corresponding to the trusted management system from the local TPM and performs platform AIK signing thereon in the TPM; then, the managing host transmits to a policy manager the signed platform configuration register values corresponding to the trusted management agent and the trusted management system, measurement logs of the platform configuration register values corresponding to the trusted management agent and the trusted management system, an AIK certificate of the managing host and an AIK certificate of the managed host, and the policy manager verifies the AIK certificates of the managing host and the managed host for validity and checks the platform configuration register values corresponding to the trusted management agent and the trusted management system; and finally, the policy manager signs, by using a private key corresponding to the identity certificate of the policy manager, a result of verifying the AIK certificates of the managing host and the managed host for validity and a result of checking the platform configuration register values corresponding to the trusted management agent and the trusted management system for integrity, and transmits the signature, the result of verifying the AIK certificates of the managing host and the managed host for validity and the result of checking the platform configuration register values corresponding to the trusted management agent and the trusted management system for integrity to the managing host, which in turn forwards the same to the managed host. The managing host and the managed host judge remote trustworthiness of the trusted management agent and the trusted management system according to the result of verifying the AIK certificates of the managing host and the managed host for validity and the result of checking the platform configuration register values corresponding to the trusted management agent and the trusted management system for integrity.

7. Network management is performed.

If confirming that both the trusted management system of the managing host and the trusted management agent operating thereon are trusted, the network user of the managed host permits communication with the managing host for management. If confirming that both the trusted management system operating thereon and the trusted management agent of the managed host are trusted, the network administrator of the managing host transmits a secure management policy to the trusted management agent on the managed host over a secure channel between the trusted management system and the trusted management agent, and the trusted management agent performs a management function on the managed host under the secure management policy distributed from the network administrator. The trusted management agent transmits some suspicious supervision results or data to the trusted management system. The trusted management system firstly analyzes these suspicious supervision results or data upon reception thereof then reports an analysis result to the network administrator, and finally the network administrator manages and controls the managed host based on the analysis result, thereby finally achieving trusted network management.

The invention claimed is:

1. A trusted network management method over a trusted network connection based on tri-element peer authentication, comprising the steps of:
   1) installing and configuring a trusted management agent residing in a managed host and a trusted management system residing in a managing host;
   2) verifying the trusted management agent for trustworthiness on the managed host and the trusted management system for local trustworthiness;
   3) if the managed host and the managing host have not been connected to a trusted network, connecting the managed host and the managing host to the trusted network respectively via a trusted network connection based on tri-element peer authentication, wherein the managed host and the managing host act as an access requestor (AR) in a trusted network connection architecture based on tri-element peer authentication, and then performing the step 4); if the managed host and the managing host have been connected to a trusted network, performing the step 4) directly;

4) performing, by the trusted management agent and the trusted management system, authentication and key negotiation;

5) if user authentication and key negotiation has not been completed between the managed host and the managing host, firstly performing, by the managing host and the managed host, mutual user authentication in a tri-element peer authentication protocol in which the managed host acts as an AR and the managing host acts as an access controller (AC), and then negotiating by the managed host and the managing host a session key using a primary key generated from the mutual user authentication and subsequently performing the step 6); if user authentication and key negotiation has been completed between the managed host and the managing host, performing the step 6) directly;

6) verifying, by the managed host and the managing host, remote trustworthiness of the trusted management agent and the trusted management system in the tri-element peer authentication protocol in which the managed host acts as an AR and the managing host acts as an AC; and 7) performing network management.

2. The trusted network management method over a trusted network connection based on tri-element peer authentication according to claim 1, wherein in the step 1), the trusted management agent is installed and configured by a network administrator or a network user; and if the trusted management agent is installed and configured by the network user, a profile is distributed from the network administrator to the network user and unknowable to the network user.

3. The trusted network management method over a trusted network connection based on tri-element peer authentication according to claim 2, wherein verifying the trustworthiness of the trusted management agent on the managed host in the step 2) comprises:

measuring, storing and reporting, by the network user of the managed host, an integrity of the trusted management agent through a trusted platform module (TPM) to thereby verify the trusted management agent for trustworthiness on the managed host; and verifying the local trustworthiness of the trusted management system in the step 2) comprises:

measuring, storing and reporting, by the network administrator of the managing host, an integrity of the trusted management system through a TPM to thereby verify the local trustworthiness of the trusted management system.

4. The trusted network management method over a trusted network connection based on tri-element peer authentication according to claim 3, wherein performing, by the trusted management agent and the trusted management system, authentication and key negotiation in the step 4) comprises:

probing, by the trusted management agent on the managed host, automatically the corresponding trusted management system; starting, by the trusted management system, authentication between the trusted management system and the trusted management agent on receiving a probe information from the trusted management agent; and then performing, by the trusted management system and the trusted management agent, mutual authentication and key negotiation using their respective profiles.

5. The trusted network management method over a trusted network connection based on tri-element peer authentication according to claim 4, wherein verifying, by the managed host and the managing host, the remote trustworthiness of the trusted management agent and the trusted management system in the tri-element peer authentication protocol in which the managed host acts as an AR and the managing host acts as an AC in the step 6) comprises the following sub-steps of:

6.1) requesting, by the managing host, the managed host for a platform configuration register value corresponding to the trusted management agent on the managed host, and requesting, by the managed host, the managing host for a platform configuration register value corresponding to the trusted management system on the managing host;

6.2) retrieving, by the managed host, the platform configuration register value corresponding to the trusted management agent from a local TPM and performing platform attestation identity key (AIK) signing thereon in the TPM, and retrieving, by the managing host, the platform configuration register value corresponding to the trusted management system from the local TPM and performing platform AIK signing thereon in the TPM;

6.3) transmitting, by the managing host, the signed platform configuration register values corresponding to the trusted management agent and the trusted management system, measurement logs of the platform configuration register values corresponding to the trusted management agent and the trusted management system, an AIK certificate of the managing host and an AIK certificate of the managed host to a policy manager, and verifying, by the policy manager, the AIK certificates of the managing host and the managed host for validity and checking the platform configuration register values corresponding to the trusted management agent and the trusted management system;

6.4) signing, by the policy manager, a result of verifying the AIK certificates of the managing host and the managed host for validity and a result of checking the platform configuration register values corresponding to the trusted management agent and the trusted management system for integrity by using a private key corresponding to an identity certificate of the policy manager, and transmitting the signature, the result of verifying the AIK certificates of the managing host and the managed host for validity and the result of checking the platform configuration register values corresponding to the trusted management agent and the trusted management system for integrity to the managing host, which in turn forwards the same to the managed host; and 6.5) judging, by the managing host and the managed host, the remote trustworthiness of the trusted management agent and the trusted management system according to the result of verifying the AIK certificates of the managing host and the managed host for validity and the result of checking the platform configuration register values corresponding to the trusted management agent and the trusted management system for integrity.

6. The trusted network management method over a trusted network connection based on tri-element peer authentication according to claim 5, wherein performing the network management in the step 7) comprises:

permitting, by the network user of the managed host, communication with the managing host for management if confirming that both the trusted management system of the managing host and the trusted management agent operating on the managed host are trusted; and transmitting, by the network administrator of the managing host, a secure management policy to the trusted management agent on the managed host over a secure channel between the trusted management system and the trusted management agent and performing, by the trusted management agent, a management function on the managed host under the secure management policy distributed from the network administrator if confirming that both the trusted management system operating on the managing host and the trusted management agent of the managed host are trusted.

* * * * *